(12) United States Patent
Swierczewski (10) Patent No.: US 6,742,838 B1
(45) Date of Patent: Jun. 1, 2004

(54) MULTIFUNCTION VEHICLE SEAT

(76) Inventor: Richard Swierczewski, 59 Oak Glen Rd., Toms River, NJ (US) 08753

( * ) Notice: Subject to any disclaimer, the term of this patent is extended or adjusted under 35 U.S.C. 154(b) by 0 days.

(21) Appl. No.: 10/390,723

(22) Filed: Mar. 19, 2003

(51) Int. Cl.$^7$ ................................................. B60N 2/42
(52) U.S. Cl. .................................................. 297/216.1
(58) Field of Search ........................... 297/216.1, 216.2, 297/216.12, 216.13, 216.14, 216.15, 216.16, 216.19

(56) References Cited

FOREIGN PATENT DOCUMENTS

| JP | 56-28716 A | 3/1981 |
|---|---|---|
| JP | 61-200040 A | 9/1986 |
| JP | 2-236032 A | 9/1990 |
| JP | 79745/1991 U | 8/1991 |
| JP | 37026/1992 U | 3/1992 |
| JP | 6-156126 A | 6/1994 |
| JP | 9-301025 A | 11/1997 |
| JP | 2000-300380 A | 10/2000 |
| JP | 2000-300381 A | 10/2000 |
| JP | 2000-300382a | 10/2000 |
| JP | 2000-309237 A | 11/2000 |
| JP | 2000-309240 A | 11/2000 |

*Primary Examiner*—Milton Nelson, Jr.
(74) *Attorney, Agent, or Firm*—Clifford G. Frayne (57) ABSTRACT

A multifunction vehicle seat reduces the impact peak and decreases the transfer of acceleration and deceleration forces to all regions of the occupant's body during frontal, rear-end and lateral collisions at high and low speed impacts or when collision becomes inevitable. The seat is isolated from the structural integrity of the vehicle by an anti-friction ball and a plurality of stabilizers. The anti-friction ball is adapted for universal movement over a movable base plate to reduce the transfer of kinetic energy to the seat and to the occupant. The stabilizers are interlocked and engaged with the seat support assembly to delay the response of the seat to the impact until a pulley system is activated. The pulley system is activated electronically or manually to deform the seat cushion, seat back and headrest during and before impact.

11 Claims, 9 Drawing Sheets

MULTIFUNCTION VEHICLE SEAT

CROSS-REFERENCE TO RELATED APPLICATION

This application is related to patent application Ser. No. 60/131,222, filed Apr. 27, 1999, now U.S. Pat. No. 6,257,663 B1.

BACKGROUND OF THE INVENTION

1. Field of the Invention

The present invention relates generally to occupant protection vehicle seats. More specifically, the invention is a vehicle seat apparatus which acts independently of the monolithic mass of the vehicle when the vehicle is involved in frontal, rear end and lateral collisions or sudden changes in velocity due to hard braking or acceleration.

2. Description of Related Art

There are many patents in the prior art which are drawn to vehicle seats for absorbing different types of forces, shocks, and vibrations commonly encountered in vehicular collisions.

For example, U.S. Pat. No. Re. 35,572 issued on Jul. 29, 1997 to Lloyd et al. discloses a seat assembly for a motor vehicle that includes an air suspension system for isolating the occupant of the seat from shock, vibration, and inertial forces directed along both vertical and horizontal axes. A base plate is mounted to the floor of the vehicle and supports first and second pairs of sleeve bearings on opposed sides of a box-like housing. The housing is attached to a pair of guide rods which cooperate with the sleeve bearings to provide fore and aft movement of the housing. Springs operating in cooperation with a first horizontally disposed air bag serves to dampen out inertial forces on the vehicle seat. The seat itself is supported atop a vertically oriented air spring and a plurality of hydraulic vibration dampeners that tend to cushion vertically directed forces acting upon the seat and its occupant.

U.S. Pat. No. 2,227,717 issued on Jan. 7, 1941 to Jones relates to structure for mounting a chair to the body of an airplane. The structure is designed to move the chair forwardly and upwardly in the event of a collision, whereby the person occupying the chair will be tossed in a curved path and thus relieved substantially from shock caused by the collision forces.

U.S. Pat. No. 3,081,059 issued on Mar. 12, 1963 to Hastings et al. Is drawn to a seat base having an inverted cone secured to the underside of the seat. The front legs of the seat are pivotally mounted to the floor of the vehicle. A single rear leg telescopes against the action of a spring.

U.S. Pat. No. 4,275,914, issued on Jun. 30, 1981 to Howleg et al., discloses an arresting device in a longitudinally adjustable guide rail assembly for motor vehicle seats. The device includes a shaft rotatably supported in a stationary bearing plate and driven by a stationary electromotor. The driving pinion of the electro-motor is in mesh with an intermediate gear which is supported for free rotation on the shaft. A coupling disk is supported for joint rotation on the shaft and for an axial displacement between the bearing plate and the face of an intermediate gear.

U.S. Pat. No. 5,292,179, issued on Mar. 8, 1994 to Forget, discloses a fixed plate supporting a vehicle seat that is secured to longitudinal adjusting slides. The fixed plate supports a rotary intermediate plate via a first ball bearing and a cover rigidly connected to the fixed plate and supported at the rotary intermediate plate via a second ball bearing. The assembly is centered on the two ball bearings.

U.S. Pat. No. 5,344,204, issued on Sep. 6, 1994 to Liu, discloses a safe driver seat unit that includes a seat supported on two rails by four ball bearings mounted in the seat legs, and a arrangement wherein an electromagnetic controller locks the seat in a normal position. In a collision, sensors will turn on power to unlock the seat so that springs may move the seat backwardly.

U.S. Pat. No. 5,605,372, issued on Feb. 25, 1997 to Al-Abdullateef, discloses an automotive safety seat that reduces g-loads imparted to an occupant during a collision by absorbing some of the energy of impact. Kinetic energy is converted to potential energy with the elevation of the seat and its occupant and the compression of springs.

U.S. Pat. No. 5,743,591, issued on Apr. 28, 1998 to Tame, discloses a vehicle seat which includes a seat cushion assembly and a hydraulic actuator. A first mounting assembly is constructed and arranged to mount the seat cushion assembly on a vehicle floor, and a second mounting assembly is provided which is constructed and arranged to mount a seat back cushion assembly on the seat cushion assembly.

German Patent No. 2,112,443, published Sep. 23, 1971, discloses a vehicle passenger safety system which has the seat belt anchorages and/or the seating rear anchorage points attached through energy absorbing components so that each passenger describes a predetermined path within the compartment with an increasing braking force until suitable padding brings the passenger to a safe stop.

German Patent No. 2,060,951, published Jun. 22, 1972, discloses a car seat that is mounted on a spring loaded support to absorb impact forces. The support is braced by either mechanical springs or hydraulic shock absorbers, and converts impact forces into a smooth recoil to protect the occupants in the event of a collision.

Great Britain Patent No. 2,087,226A, published May 26, 1982, discloses a shock absorbing seat that is formed by two connected portions. The shorter rear portion is a flat metal sheet bent upwardly at the back and riveted to the rear cross-member of a tubular support frame. The front portion includes a metal sheet which is "waisted" in plan view and curved upwardly from the rear in side elevation to a smoothly curved peak from which it is bent downwardly as a flat vertical panel. The panel is riveted along its lower edge to the front cross-member of the support frame.

None of the above inventions and patents, taken either singly or in combination, is seen to disclose a multi-function seat which acts independently of the monolithic mass of the vehicle when frontal, rear end and lateral collisions occurs or becomes inevitable as will subsequently be described and claimed in the instant invention.

SUMMARY OF THE INVENTION

A multi-function vehicle seat reduces the impulse peak and decreases the transfer of acceleration-deceleration forces to all regions of the occupants body during frontal, as well as rear-end and lateral collisions in high and low speed impacts. The interlock seat support assembly with the vehicle floor pan separates the seat from the monolithic mass of the vehicle. In response to a sudden hard change in the velocity of the vehicle, a movable base plate dissipates forces of collision and reduces the transfer of crash energy to the seat assembly and occupant. The seat adopts a pulley system activated and controlled electronically or manually when collision occurs or becomes inevitable. A pulley system balances the seat cushion, the seat back and the headrest to the alteration occupant kinematics to protect occupants from the first, the second and the third collision.

Accordingly, it is a principal object of the invention to provide a multi-function vehicle seat apparatus including a pulley system to controlled position of the deformable seat cushion, the seat back cushion and the headrest to minimize the acceleration and deflection in all regions of the occupant's body in a variety of collision scenario to prevent injury to occupants from the first, the second and the third collisions.

It is another object of the invention to provide a multi-function vehicle seat including a pulley system activated electronically by avoidance system or manually by the driver when collision becomes inevitable to offer occupant the safest position before impact.

It is another object of the invention to provide a multi-function vehicle seat including a plurality of stabilizers interlock attached to the vehicle floor pan to separate the seat assembly from the monolithic mass of the vehicle.

It is another object of the invention to provide a multi-function vehicle seat including an anti-friction ball which rests upon the base plate or floor pan involved to rotation over high coefficient friction top surfaces of the base plate or floor pan to reduce the impact peak by extending the stopping distance and the pulse duration.

It is another object of the invention to provide a multi-function vehicle seat including an absorbing energy movable base plate encapsulated within a cover to dissipate crash energy and reduce the transfer of the acceleration-deceleration forces to the seat assembly and occupant.

It is another object of the invention to provide a multi-function vehicle seat including a support structure configured as a pyramid open on its rear side to form a niche beneath the seat cushion and seat frame with upper and lower arms shaped as concave to form a niche behind a seat back cushion to offer occupant safest position before and during collision.

It is another object of the invention to provide a multi-function vehicle seat including a pulley strap attached to a tightening device and to the bottom of the seat cushion and the rear of the seat back cushion and the rear of the headrest to balance their motion with occupant kinematics.

It is another object of the invention to provide a multi-function vehicle seat including an actuator disposed on the upper arm of the seat frame to connect a strap attached to the headrest to pull a changeable region of the headrest into an unobstructed volume formed behind the headrest.

Another object of the invention is to provide a multi-function vehicle seat including electronically operated stretching energy belts to control the position of the seat frame to hold the occupant in the desired position in the event of an accident or extreme driving condition.

It is an object of the invention to provide improved elements and arrangements thereof in an apparatus for the purposes described which are dependable, flexible in movement, and fully effective in accomplishing their intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
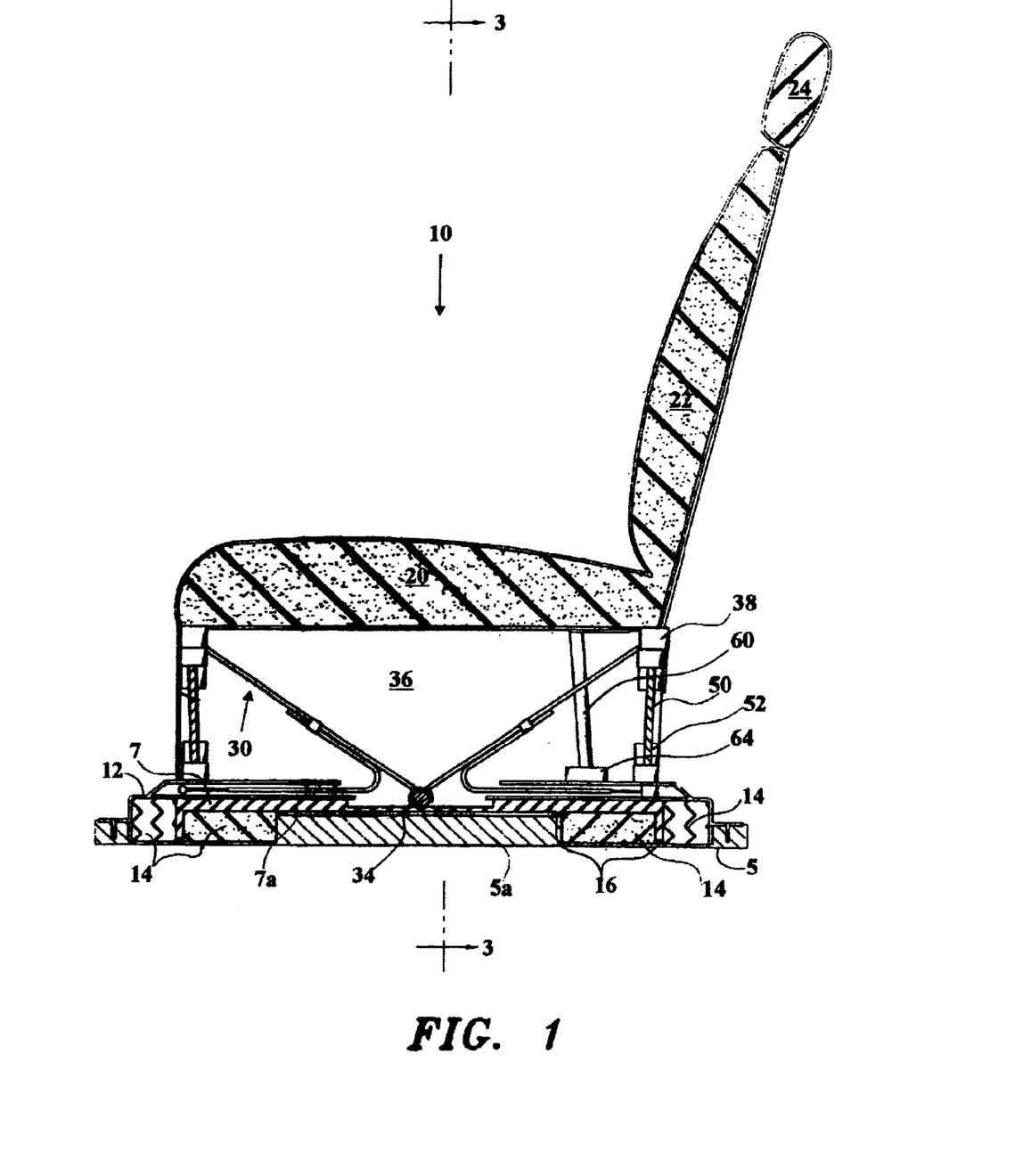
FIG. 1 is a side, sectional view of a vehicle seat in its normal position according to the present invention.
Figure 2:
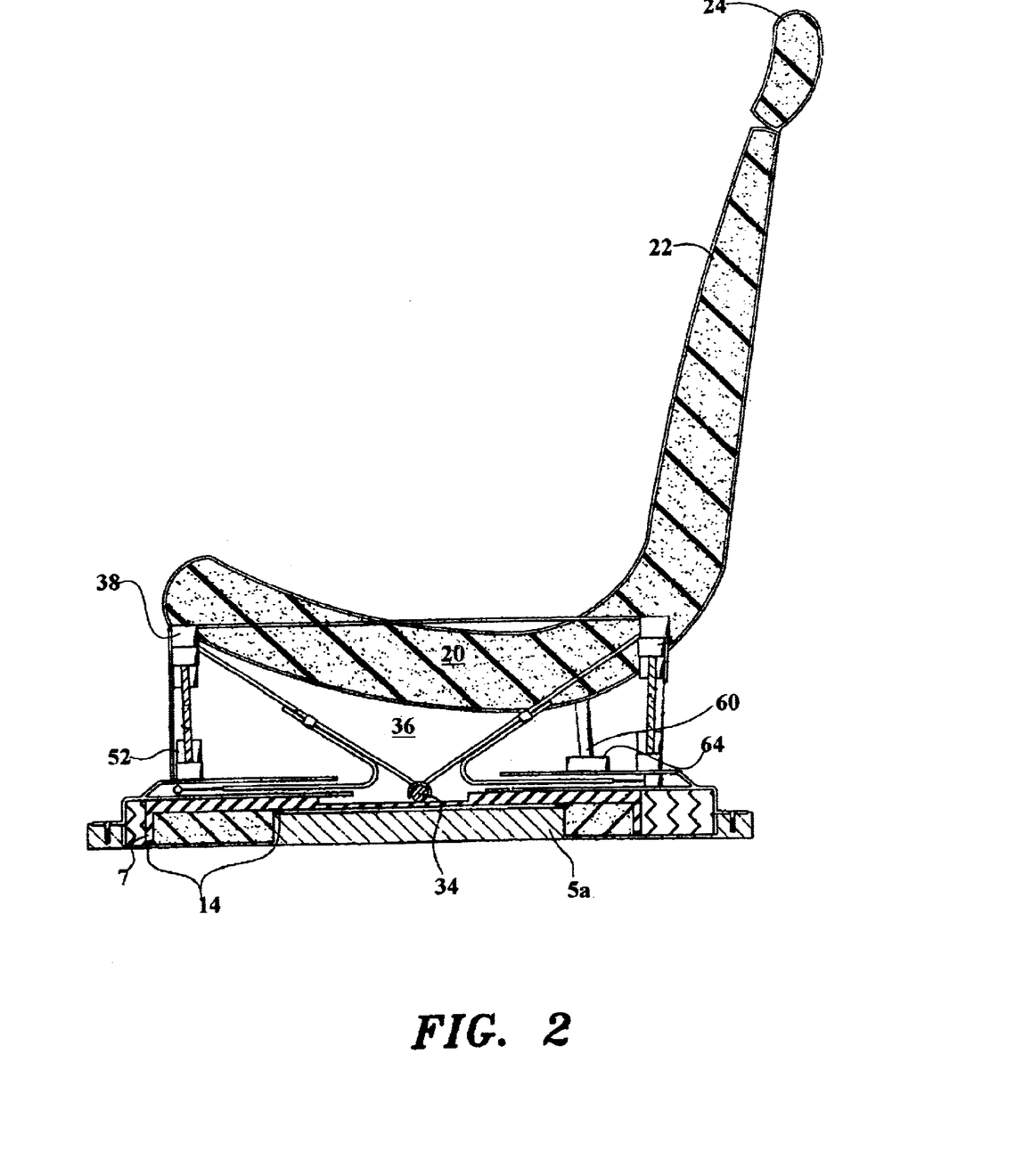
FIG. 2 is a side, sectional view of a vehicle seat in a response position after impact according to the present invention.
Figure 3:
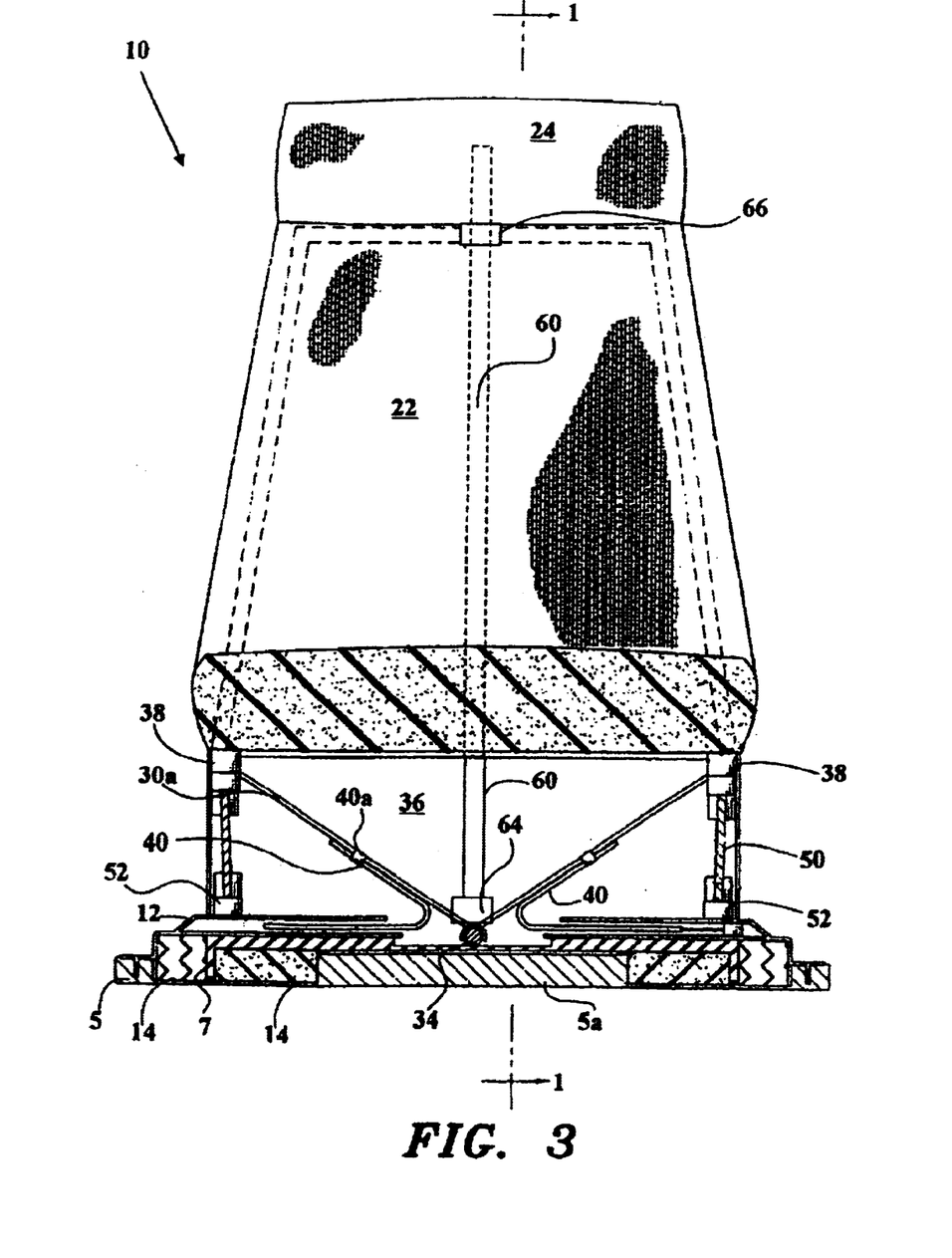
FIG. 3 is a front view, partly in section of a vehicle seat in its normal position according to the present invention.
Figure 4:
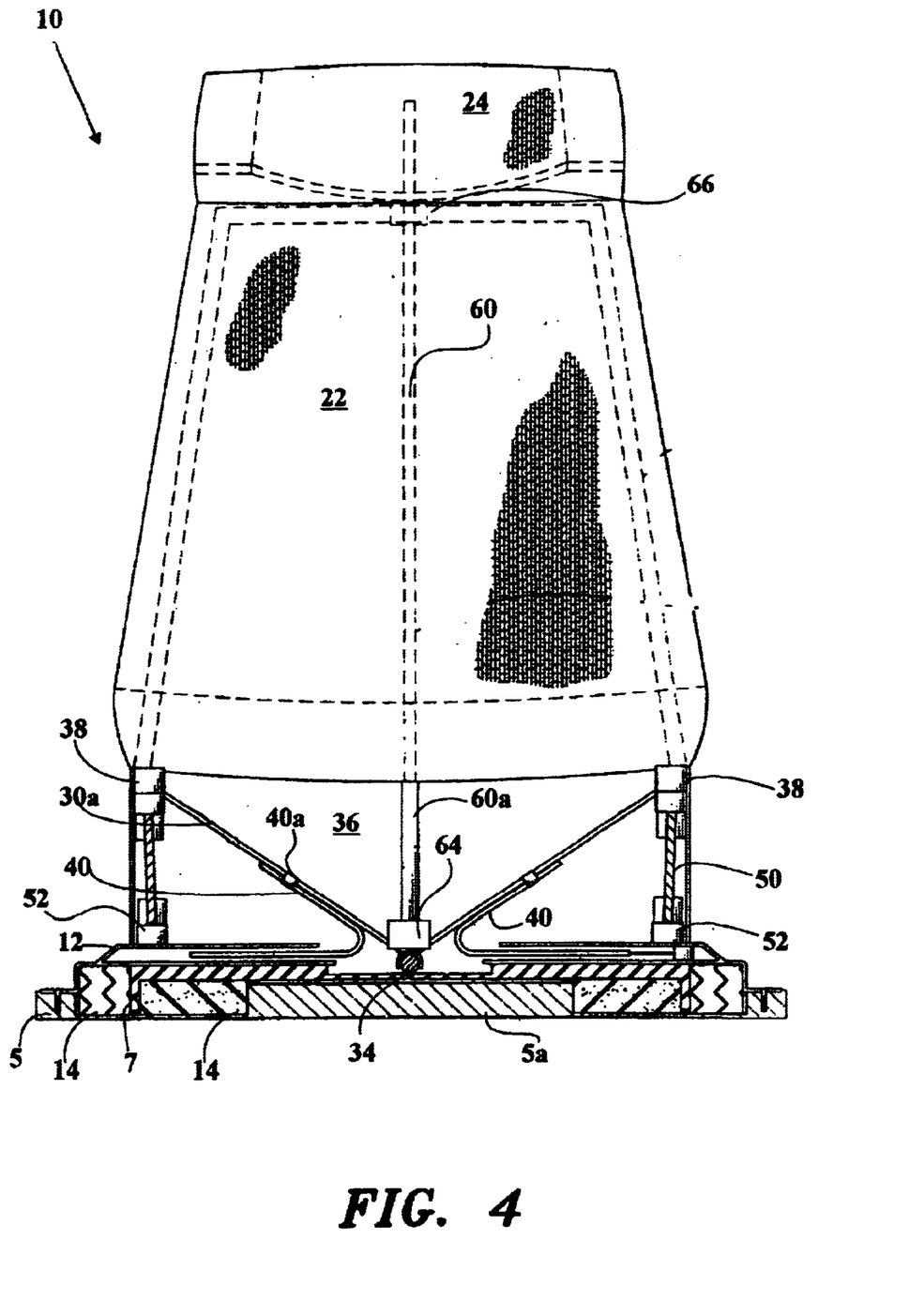
FIG. 4 is a rear view of a vehicle seat in its normal position according to the present invention.

Attention is first directed to FIGS. 1, 3 and 4 wherein the seat apparatus of the present invention is generally indicated at 10. A movable base plate 7 has a cavity 7a formed therein, which cavity is adapted to receive an immovable raised disk formation 5a affixed to vehicle floor 5. Base plate 7 is mounted for omnidirectional horizontal movement and is encapsulated within base plate cover 12. An array of resilient elastomer structures 14 are disposed in the cavity between base plate 7 and base plate cover 12. the structures 14 are designed to act in a very limited space and loads to dissipate the crash energy and to limit displacement of movable base plate 7. The horizontal movement of base plate 7 is gradually diminished in subsequent time intervals. The resilient elastomer structures 14 function to absorb and reduce transfer crash energy to the seat assembly and to return the base plate 7 to its original position after the collision forces have abated. Plural ball bearings 16 interpose the bottom of base plate 7, disk 5a and floor 5 to minimize interaction between base plate 7 and the vehicle involved when there is a hard change in velocity. Forces generated in the event of a collision or hard change in velocity will cause base plate 7 to slide on disk 5a and/or floor 5 surfaces with material having a high coefficient of friction (natural or synthetic rubber, etc.).

Figure 6:
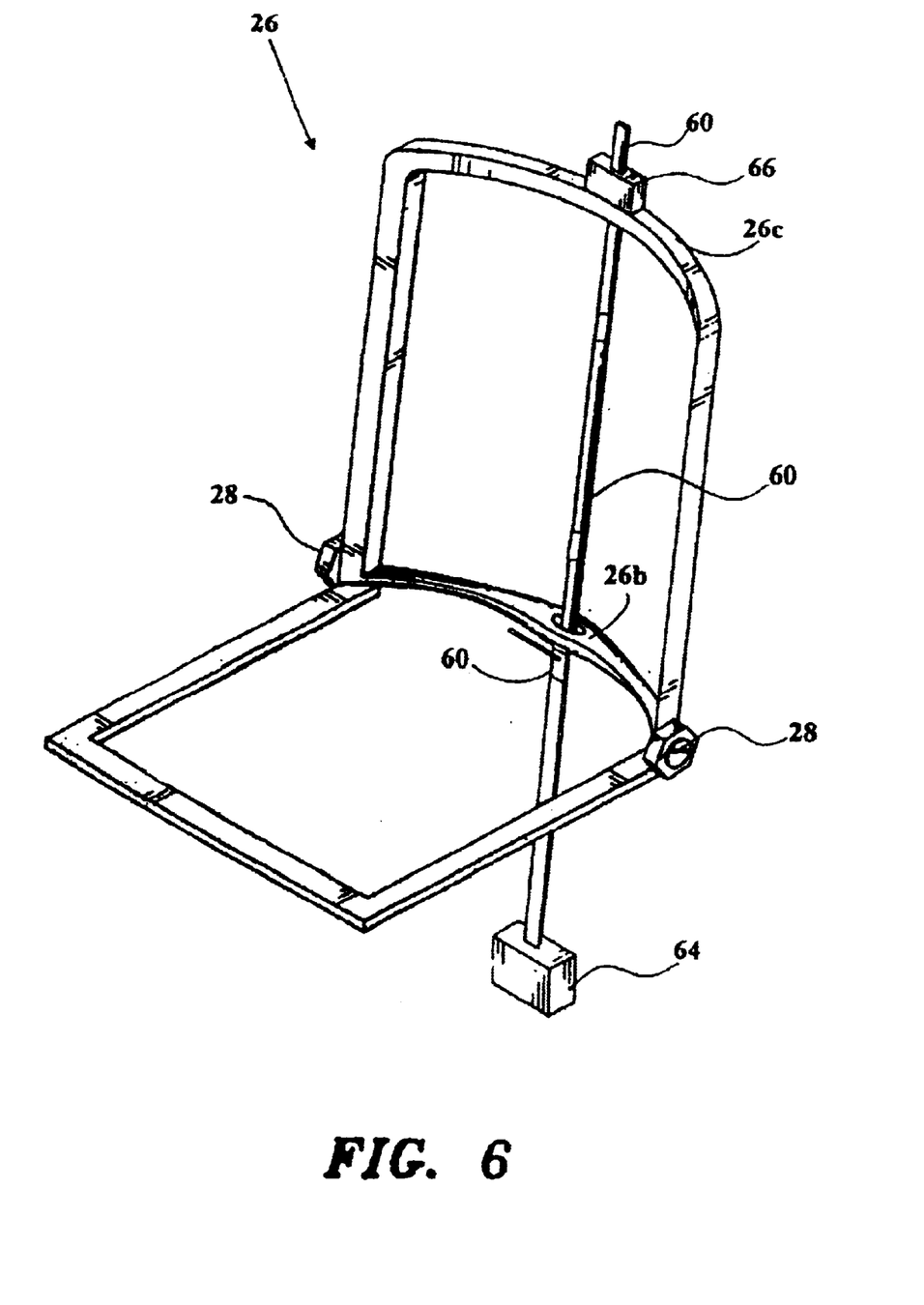
FIG. 6 is a perspective view of the frame of a vehicle seat and pulley strap in the deployed position according to the present invention.

A vehicle seat cushion 20 and seat back cushion 22 are positioned above base plate 7 via a seat support structure 30 and stabilizers 40. A head rest 24 is affixed to the top of seat frame 26. As best seen in FIG. 6, seat frame 26 has a lower arm 26b and upper arm 26c configured as a concave to form a niche behind seat back cushion 22. Frame 26 is constructed from high-strength, light-weight aluminum, magnesium or plastic composite. Pivots 28 are provided so that the seat back 22 may be adjusted at plural reclined positions. A pulley strap 60 whose function will be explained below extends through the lower arm 26b and upper arm 26c of the seat frame 26.

Figure 7:
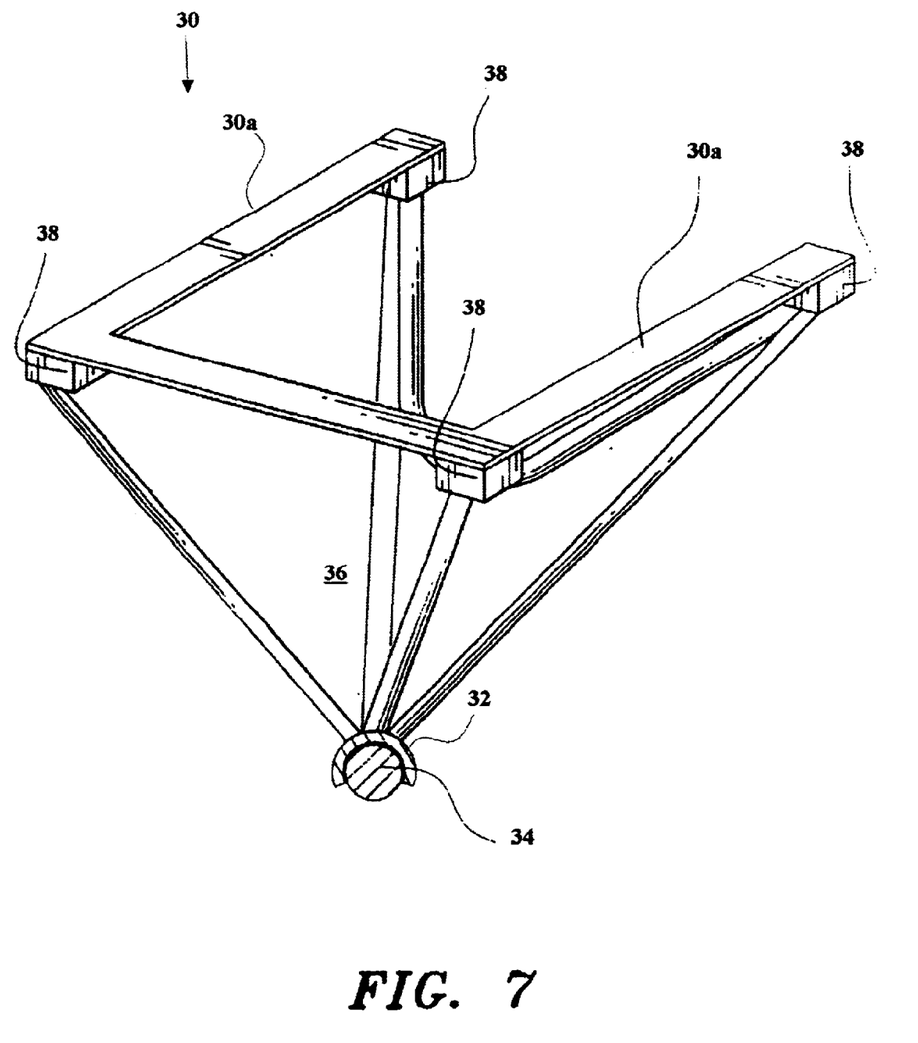
FIG. 7 is a perspective view of the frame support structure of a vehicle seat according to the present invention.

Frame 26 is adapted to be mounted on support structure 30 (FIG. 7). Structure 30 is configured as a pyramid having an apex 32 and a rectangular base 30a and an open rear side.

Apex 32 is designed to retain an antifriction ball 34, which ball rests upon base plate 7 or floor pan 5. The ball 34 functions to reduce the transfer of acceleration-deceleration forces to the seat and occupant. The rotation of ball 34 minimizes the impact peak trough extending the stopping distance and pulse duration. Structure 30 is fabricated from a light-weight, high-strength aluminum, magnesium or plastic composite. When assembled, a niche or unobstructed volume 36 will be formed immediately beneath seat cushion 20. The niche 36 functions to receive the deformable region of the seat cushion to allow occupant high retention pelvis and reduce the angle between the occupant's torso and head. In the same time the undeformable region of the seat cushion protects the occupant's legs.

Figure 8:
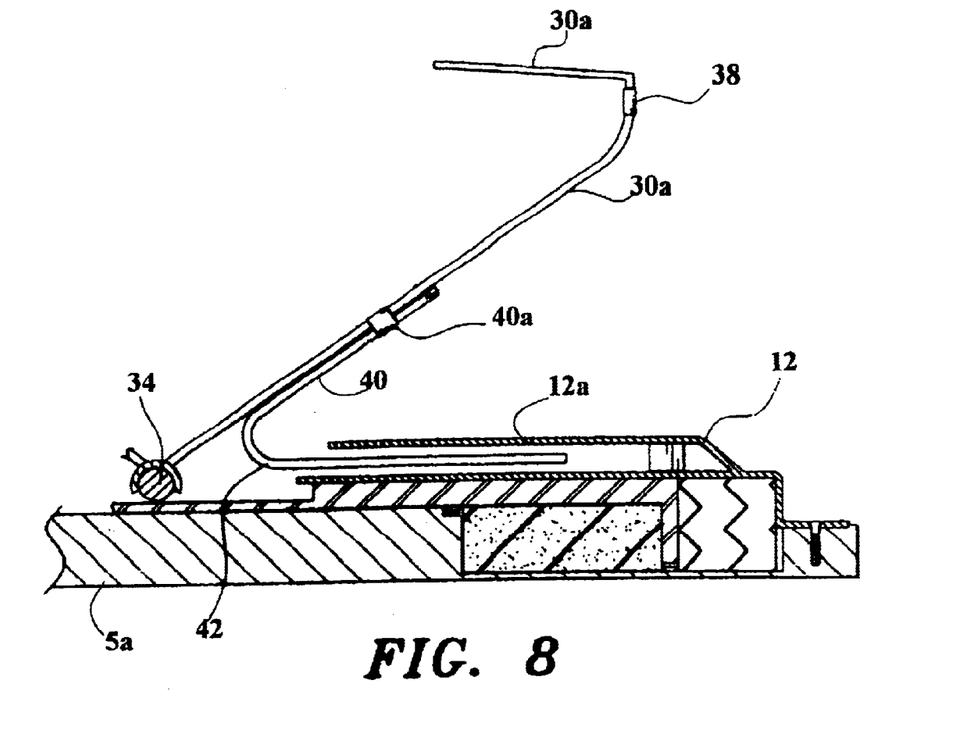
FIG. 8 is a sectional, side view of a stabilizer support of a vehicle seat according to the present invention.
Figure 9:
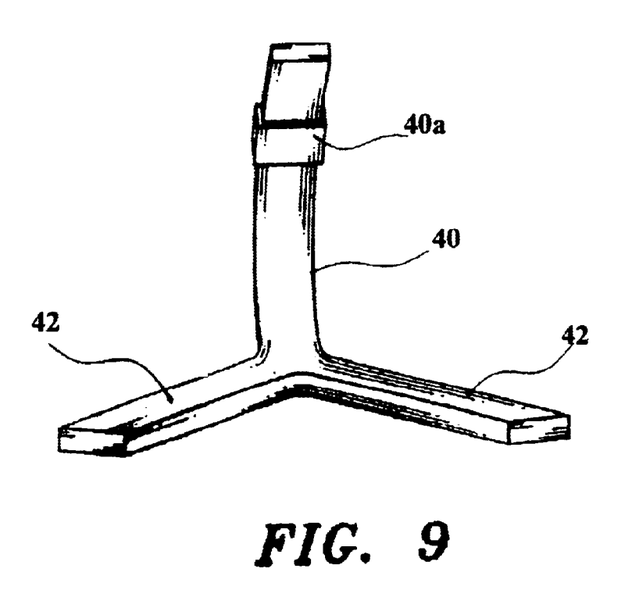
FIG. 9 is a front view of a stabilizer support of a vehicle seat according to the present invention.

As best seen in FIGS. 8 and 9, plural stabilizer members 40 have vertical arms attached to structure 30 at supporting point 40a and horizontally positioned lower arms 42 interlock attached to the vehicle floor pan. The stabilizer functions to hold the seat cushion and seat back in properly aligned position before, during and after a collision and/or hard change in velocity of the vehicle. The stabilizer interlock attachments function to separate the seat assembly of the collided vehicle to reduce the mass and delay response of the seat assembly to the impact to extend time and length. Additionally the stabilizer 40 acts as a track seat adjuster.

Figure 5:
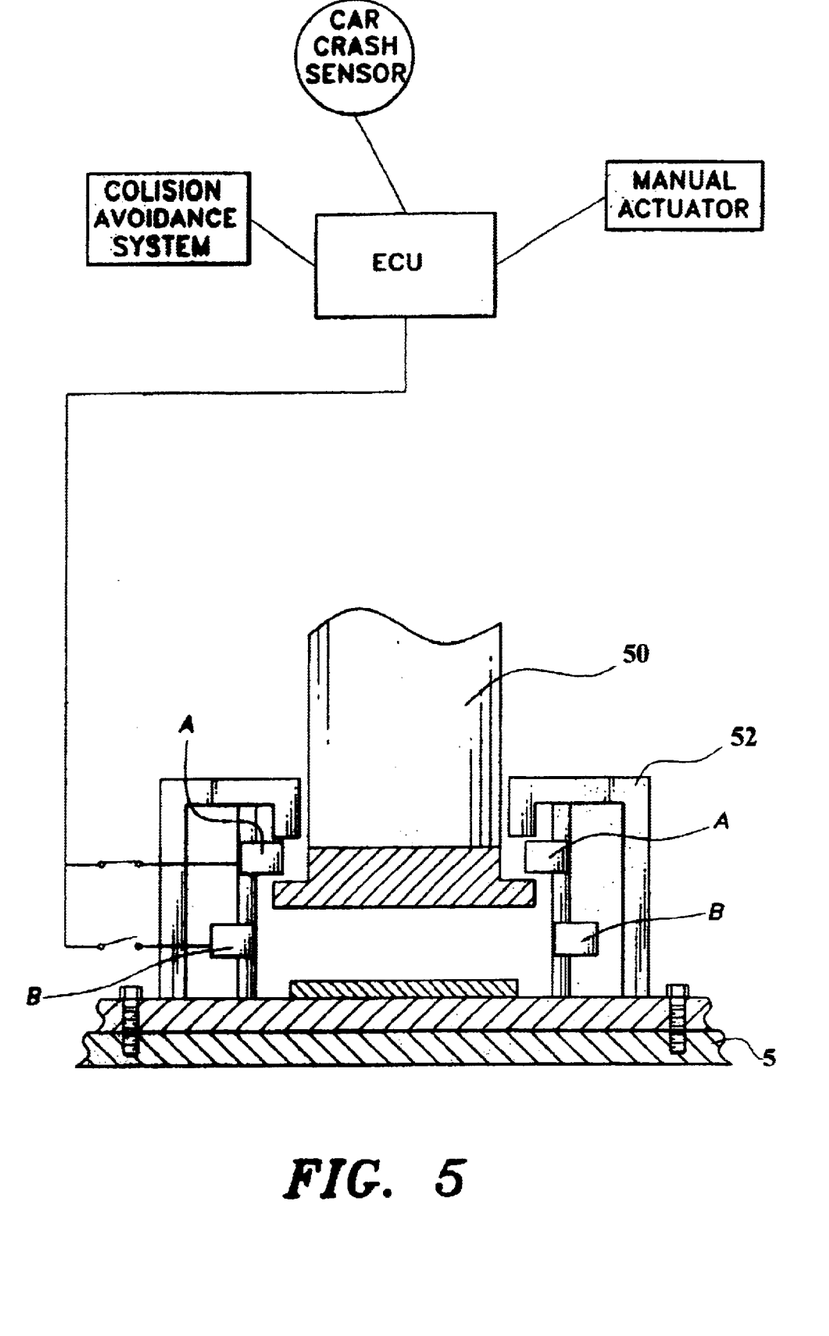
FIG. 5 is a partial, sectional view of an electronically operating stretching energy belt according to the present invention.

Alternatively operated stretching belts 50 are positioned at each corner of the seat assembly. The upper ends of belts 50 are attached to respective anchors 38 positioned at each corner of support structure 30. The anchors 38 also absorb the shocks and vibrations commonly encountered in different types of vehicle collisions. Additionally anchor 38 acts as a high seat adjuster. The lower ends of belts 50 are secured in cylinder bore 52. As best illustrated in FIG. 5, an electronic control unit transmits signals from a collision avoidance system or from an acceleration or pressure sensor when impact occurs or from driver before impact. The signals are transmitted to the first series A and the second series B solenoids. Depending on the collision scenario or vehicle position, the solenoids selectively extend or retract the stretching energy belts 50 through passages in the cylinder bore 52. The solenoids A and B control the length of belts 50 to hold the support structure 30 in proper response position when the vehicle is unstable during impact or extreme driving condition. The cylinder bore 52 is secured to the top of base plate cover 12. The stretching belt 50 also functions to increase ergonomic comfort.

Figure 10:
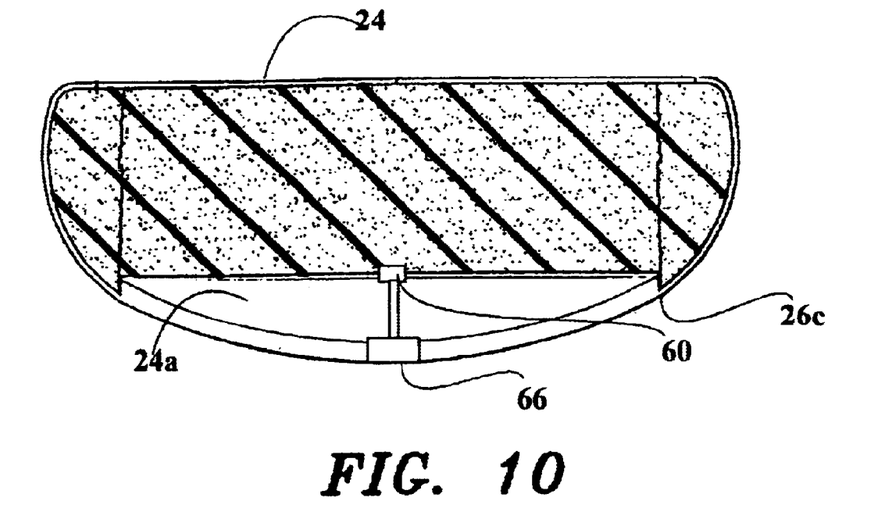
FIG. 10 is a top, sectional view of a headrest in its normal position according to the present invention.
Figure 11:
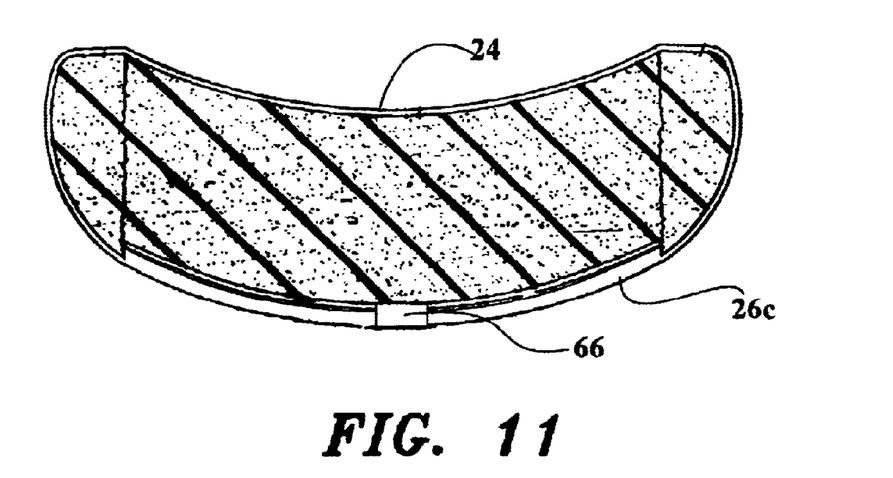
FIG. 11 is a top, sectional view of a headrest in a response position during a rear-end or lateral impact according to the present invention.

Electronically or manually activated pulley strap 60 is disposed to deform the seat cushion 20, seat back cushion 22 and headrest 24 in sudden hard change of vehicle in velocity or before impact to prepare all regions of the occupant's body to balance with kinematics seat assembly. The first end of pulley strap 60 is attached to the bottom of deformable regions of seat cushion 20, seat back cushion 22 and headrest 24. A second end of strap 60 is attached to a pre-tensioning or tightening device 64, which device is secured to base plate cover 12. As is conventional in the art, tightening device 64 is based on existing pre-tensioning systems most likely pyrotechnical. Device 64 functions to tighten strap 60 in the event of a collision or before impact. Upon such tightening the deformable region seat cushion 20 and seat back 22 are pulled downward into the niche formed by support structure 30 and upper and lower arms 26b, 26c of seat frame 26. The movement of the deformable regions of the seat cushion 20 and seat back 22 allows the occupant to achieve the safest position during collision or before impact. The occupant's pelvis is lowered and the angle between the supported torso and unsupported head is reduced. The legs are protected by the non-deformable part of the seat cushion. As best seen in FIGS. 9 and 10, an actuator 66 is positioned on the upper arm 26c of seat frame 26 to extend the function of tightening device 64. Actuator 66 functions to connect tighten strap 60 attached to seat back cushion 22 with strap 60 attached to headrest 24. During a rear end or lateral collision only the strap 60 attached via actuator 66 and upper seat frame 26 pulls back the deformable region of headrest 24 preventing whiplash.

The uniquely designed seat of the instant invention is designed to act separately from the structural integrity of the vehicle during a collision or hard changes in velocity at high and low speeds. The seat functions to reduce the impact peak by isolating the seat assembly from the monolithic mass of the vehicle as well as extended another determinants acceleration-deceleration forces such as time and length. The deformable seat cushion, seat back and headrest provide a soft dynamic response to the impact and balances the seat assembly to the alter the occupant's kinematics during hard change in velocity of the vehicle. Moreover, the pulley system, activated electronically by the collision avoidance system or manually by the driver before impact, promises the occupant the safest position ever to prevent injury from ejection and whiplash. As contemplated, air bags integrated with seatbelts will be incorporated with the seat to deploy from the occupant to the vehicle instead of towards the occupant as claimed in related U.S. Pat. No. 6,257,663B1.

It is to be understood that the present invention is not limited to the sole embodiment described above, but encompasses any and all embodiments within the scope of the following claims.

I claim:

1. A multifunction vehicle seat system, for decreasing acceleration-deceleration forces to regions of an occupant's body during a frontal, rear end or lateral collision at high or low speeds by altering the position of occupants seat assembly when an impact becomes inevitable, said multifunction vehicle seat system comprising:

a seat cushion having a first means interposing said seat cushion to deform said seat cushion during collisions of the vehicle at impact and restoring said seat cushion to an original position;

a seat back cushion having a first means interposing said seat back cushion to deformed said seat back cushion during collision of said vehicle and at impact and restoring said seat back cushion to an original position;

a headrest having a first means for deforming said headrest during said rear-end or said lateral collisions of said vehicle and restoring said headrest to an original position;

a seat internal frame, said seat internal frame being formed with a void beneath said seat cushion and behind said seat back and said headrest and supporting said seat cushion, said seat back and said headrest;

a bottom support structure, said bottom support structure having a plurality of connected angular struts forming a hollow pyramid having an apex and including a plurality of mutually engageable stabilizers;

said plurality of stabilizers having upper slope arms attached to said bottom support structure and lower lateral arms disposed in a cover member, said cover member formed with plural U-shaped openings and immovably secured to a floor of a vehicle;

an anti-friction ball, said anti-friction ball attached to said bottom support structure at said apex;

a base plate, said base plate adapted to be movably encapsulating in said cover member, said base plate being movable from an original position and having an upper surface engaged with said anti-friction ball;

a second means disposed in said cover member for restoring said base plate to said original position;

a third means for deforming said seat cushion, said seat back cushion and said headrest during acceleration-deceleration forces at collision;

an electronically operated means including an actuator member connecting said bottom support structure with said cover member.

2. The multifunction vehicle seat according to claim 1, wherein said first means for deforming and restoring said seat cushion, said seat back cushion, and said headrest to an original position comprises a resilient elastomer material interposed in said seat cushion, said seat back and said headrest.

3. The multifunction vehicle seat according to claim 1, wherein said internal frame formed with a void behind said seat back cushion and said headrest, comprises concave shaped lower and upper arms.

4. The multifunction vehicle seat according to the claim 1, wherein said cover member is formed with plural U-shaped openings and wherein said second means for restoring said base plate to said original position comprises an elastomer structures disposed in said respective U-shaped openings of said cover member.

5. The multifunction vehicle seat according to claim 1, wherein said base plate and said cover member is formed with plural U-shaped openings; a plurality of stabilizer members having said upper slope arms attached to said bottom support structure and said lower lateral arms disposed in U-shaped openings of said cover member.

6. The multifunction vehicle seat according to claim 1, wherein said anti-friction ball is attached to said bottom support structure at said apex, said anti-friction ball engaged with an upper surface of said base plate.

7. The multifunction vehicle seat according to claim 1, wherein said base plate is formed with a bottom surface and wherein a plurality of ball bearings are interposed said bottom surface and a vehicle floor.

8. The multifunction vehicle seat according to claim 1, wherein said a third means includes a tightening device disposed on said cover member and in communication with said actuator member.

9. The multifunction vehicle seat according to claim 8, wherein said a third means includes a pulley strap extending from said tightening device said pulley strap attached to a bottom surface of said seat cushion and traversing a rear surface said seat back cushion and said actuator member and having an end attached to a rear surface of said headrest.

10. The multifunction vehicle seat according to claim 1, wherein said electronically operated means includes an anchor attached at each corner of said bottom support structure;

a plurality of cylinder bores positioned on said cover member below each anchor;

an elastic energy belt selectively extending from each said cylinder bores to each anchor; and an electronic control unit said electronic control unit being wired to selective solenoids positioned in each cylinder bore.

11. The multifunction seat according to claim 10, wherein said electronic control unit includes a crash sensor and collision avoidance system and switch physically located inside said electronic control unit.

* * * * *